(12) United States Patent
Naito et al.

(10) Patent No.: US 8,439,259 B2
(45) Date of Patent: May 14, 2013

(54) CODE READING APPARATUS, SALES REGISTRATION PROCESSING APPARATUS, AND CODE READING METHOD

(75) Inventors: Hidehiro Naito, Shizuoka (JP); Hitoshi Iizaka, Shizuoka (JP); Hidemi Mihara, Shizuoka (JP); Yoshiya Yamada, Shizuoka (JP); Osamu Tsuchiya, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 274 days.

(21) Appl. No.: 13/029,251

(22) Filed: Feb. 17, 2011

(65) Prior Publication Data

US 2011/0220720 A1  Sep. 15, 2011

(30) Foreign Application Priority Data

Mar. 10, 2010  (JP) ................................. 2010-053767

(51) Int. Cl.
   G06K 5/00     (2006.01)
(52) U.S. Cl.
   USPC ......................................................... 235/437
(58) Field of Classification Search .................. 235/435, 235/437, 462.01, 470
   See application file for complete search history.

(56) References Cited

U.S. PATENT DOCUMENTS

| | | | |
|---|---|---|---|
| 7,108,188 B2 * | 9/2006 | Hoshino | 235/462.13 |
| 2007/0080249 A1 * | 4/2007 | Hamasuna et al. | 241/36 |
| 2011/0147454 A1 * | 6/2011 | Matsuhisa et al. | 235/383 |
| 2011/0269239 A1 * | 11/2011 | Diessel et al. | 436/43 |
| 2012/0273563 A1 * | 11/2012 | Shimamoto et al. | 235/375 |

FOREIGN PATENT DOCUMENTS

| | | |
|---|---|---|
| JP | 10501360 | 2/1998 |
| JP | 11-003397 | 1/1999 |
| JP | 2005-276119 | 10/2005 |
| JP | 2008-205774 | 9/2008 |
| WO | 9613798 | 5/1996 |

OTHER PUBLICATIONS

Japanese Office Action for Japanese Application No. 2010-053767 mailed on Feb. 28, 2012.

* cited by examiner

*Primary Examiner* — Thien M Le
*Assistant Examiner* — Christle Marshall
(74) *Attorney, Agent, or Firm* — Turocy & Watson, LLP

(57) ABSTRACT

According to one embodiment, a code reading apparatus includes an image capturing unit, a determining unit, and a notifying unit. The image capturing unit captures an image picked up by an image pickup unit. The determining unit determines whether the image captured by the image capturing unit satisfies a condition for extracting code data from a code symbol. The notifying unit notifies, if the determining unit determines that the image does not satisfy the condition, a cause that prevents satisfaction of the condition or a method of improving the image pickup.

11 Claims, 8 Drawing Sheets

BARCODE ATTACHED SURFACE TILTS DOWNWARD.
PLEASE SET BARCODE TO BE RIGHT OPPOSED TO CAMERA.

COMMODITY IS AWAY FROM CAMERA.
PLEASE BRING COMMODITY CLOSE TO CAMERA.

PART OF BARCODE IS NOT PHOTOGRAPHED.
PLEASE SCAN BARCODE TO PHOTOGRAPH ENTIRE
BARCODE.

BARCODE CANNOT BE CORRECTLY READ.
PLEASE REMOVE SOIL OR SMOOTH CREASES OF PACKAGE
TO SCAN BARCODE.

CODE READING APPARATUS, SALES REGISTRATION PROCESSING APPARATUS, AND CODE READING METHOD

CROSS-REFERENCE TO RELATED APPLICATIONS

This application is based upon and claims the benefit of priority from the prior Japanese Patent Application No. 2010-053767, filed on Mar. 10, 2010; the entire contents of which are incorporated herein by reference.

FIELD

Embodiments described herein relate generally to a code reading apparatus, a sales registration processing apparatus, and a code reading method.

BACKGROUND

In the past, in a supermarket or the like, a code reading apparatus has been used that picks up, with an image sensor of a CCD camera or the like, an image of a code symbol such as a barcode attached to a commodity and reads code data of the barcode from the picked-up image.

JP-T-10501360 (the term "JP-T" as used herein means a published Japanese translation of a PCT patent application) discloses a scanner of a handy type that decodes a label image picked up by a CCD camera. On the other hand, with a scanner of a vertical type vertically provided on a counter of a supermarket or the like, an operator can handle a commodity using both hands. Therefore, the scanner of the vertical type can improve work efficiency to be higher than work efficiency in reading a barcode with a hand scanner.

However, with such a vertical scanner, the operator scans a barcode while moving a commodity. Therefore, depending on timing and a situation of image pickup, a clear image cannot be obtained or a part of the barcode cannot be read.

In such a case, the operator picks up an image of the barcode of the commodity again. However, if it is unknown why code data cannot be read, in some case, the operator fails in reading the barcode even if the operator reads the barcode again. Therefore, the operator has to repeatedly scan the barcode.

DETAILED DESCRIPTION

In general, according to one embodiment, a code reading apparatus includes an image capturing unit, a determining unit, and a notifying unit. The image capturing unit captures an image picked up by an image pickup unit. The determining unit determines whether the image captured by the image capturing unit satisfies a condition for extracting code data from a code symbol. The notifying unit notifies, if the determining unit determines that the image does not satisfy the condition, a cause that prevents satisfaction of the condition or a method of improving the image pickup.

According to another embodiment, a sales registration processing apparatus includes a receiving unit, a determining unit, and a notifying unit. The receiving unit receives an image picked up in a code reading apparatus. The determining unit determines whether the image received by the receiving unit satisfies a condition for extracting code data from a code symbol. The notifying unit notifies, if the determining unit determines that the image does not satisfy the condition, a cause that prevents satisfaction of the condition or a method of improving the image pickup.

According to still another embodiment, a code reading method is executed in a code reading apparatus. The code reading method includes: capturing an image picked up by an image pickup unit; determining whether the captured image satisfies a condition for extracting code data from a code symbol; and notifying, if it is determined that the image does not satisfy the condition, a cause that prevents satisfaction of the condition or a method of improving the image pickup.

Figure 1:
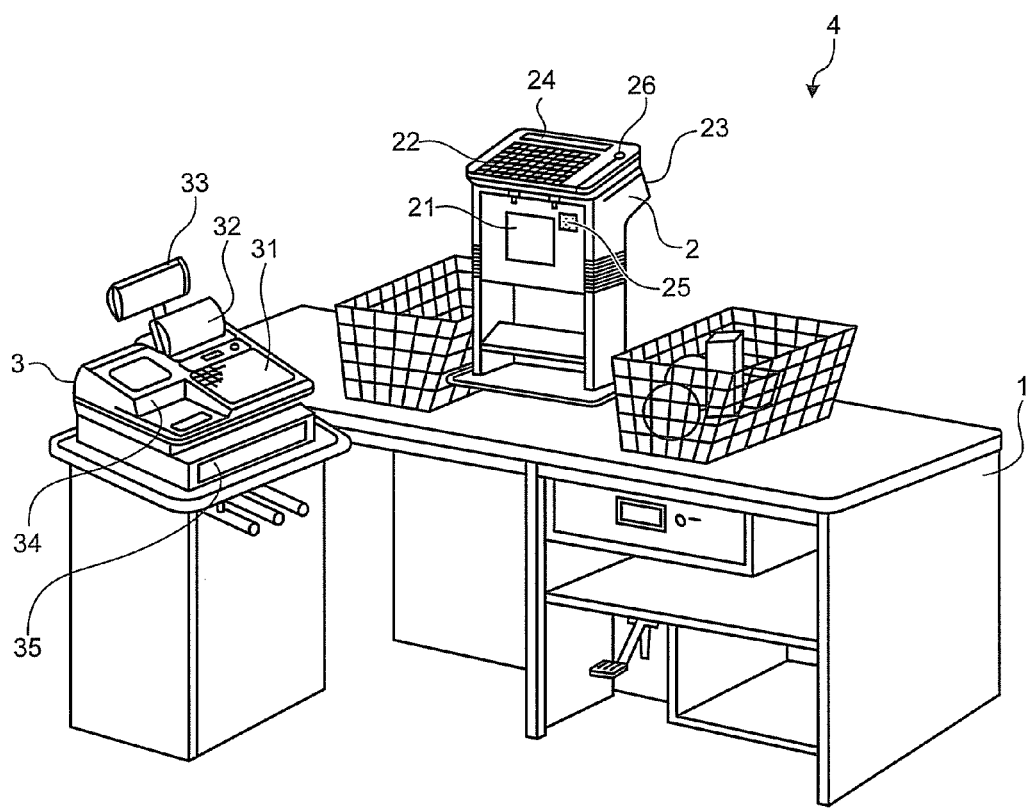
FIG. 1 is a schematic external perspective view of the configuration of a checkout lane system including a code reading apparatus according to an embodiment.

FIG. 1 is a schematic perspective view of the configuration of a checkout lane system 4 including a code reading apparatus 2 according to an embodiment. As shown in FIG. 1, the checkout lane system 4 includes a sucker table 1, the code reading apparatus 2, and a POS terminal 3. A shopping basket including commodities is placed on the sucker table 1. The code reading apparatus 2 is vertically provided in substantially the center of the sucker table 1. The POS terminal 3 is connected to the code reading apparatus 2 by a not-shown transmission line to be capable of communicating with each other.

The POS terminal 3 performs sales registration for commodities to be purchased by a customer. As shown in FIG. 1, the POS terminal 3 includes a keyboard 31, a display for operator 32, a display for customer 33, a printer 34 configured to perform receipt printing and the like, and a drawer 35 for storing cash and the like. On the keyboard 31, a closing key and the like necessary for settlement of commodity prices are disposed. The POS terminal 3 has configuration and functions same as configuration and functions of a POS terminal typically used in a checkout lane system of this type.

The code reading apparatus 2 reads a barcode attached to a commodity. The code reading apparatus 2 outputs code data included in the barcode to the POS terminal 3. As shown in FIG. 1, the code reading apparatus 2 mainly includes a reading window 21, a keyboard 22, a display for customer 23, a display for store clerk 24, a display LED 26, and a buzzer 25.

The keyboard 22 receives input by various keys when a store clerk performs registration of a commodity that cannot be registered by using a barcode. The display for customer 23 displays a name, a price, and the like of a registered commodity to a customer.

The display for store clerk 24 displays the name, the price, and the like of the registered commodity to the store clerk. If the read barcode does not satisfy a predetermined condition for a barcode as an image, the display for store clerk 24 displays a cause that prevents satisfaction of the condition or a method of improving image pickup and notifies an operator of the cause of the prevention or the method of improving the image pickup.

The display LED 26 is turned on when a barcode attached to a commodity is read and notifies the operator that the barcode is read.

If the read barcode does not satisfy the predetermined condition for a barcode as an image, the buzzer 25 sounds and notifies the operator to that effect.

On the inside of the code reading apparatus 2 on which the reading window 21 is provided, a charge coupled device (CCD) camera 20 (see FIG. 2) is provided. In the following explanation, the CCD camera 20 is simply referred to as camera 20.

Figure 2:
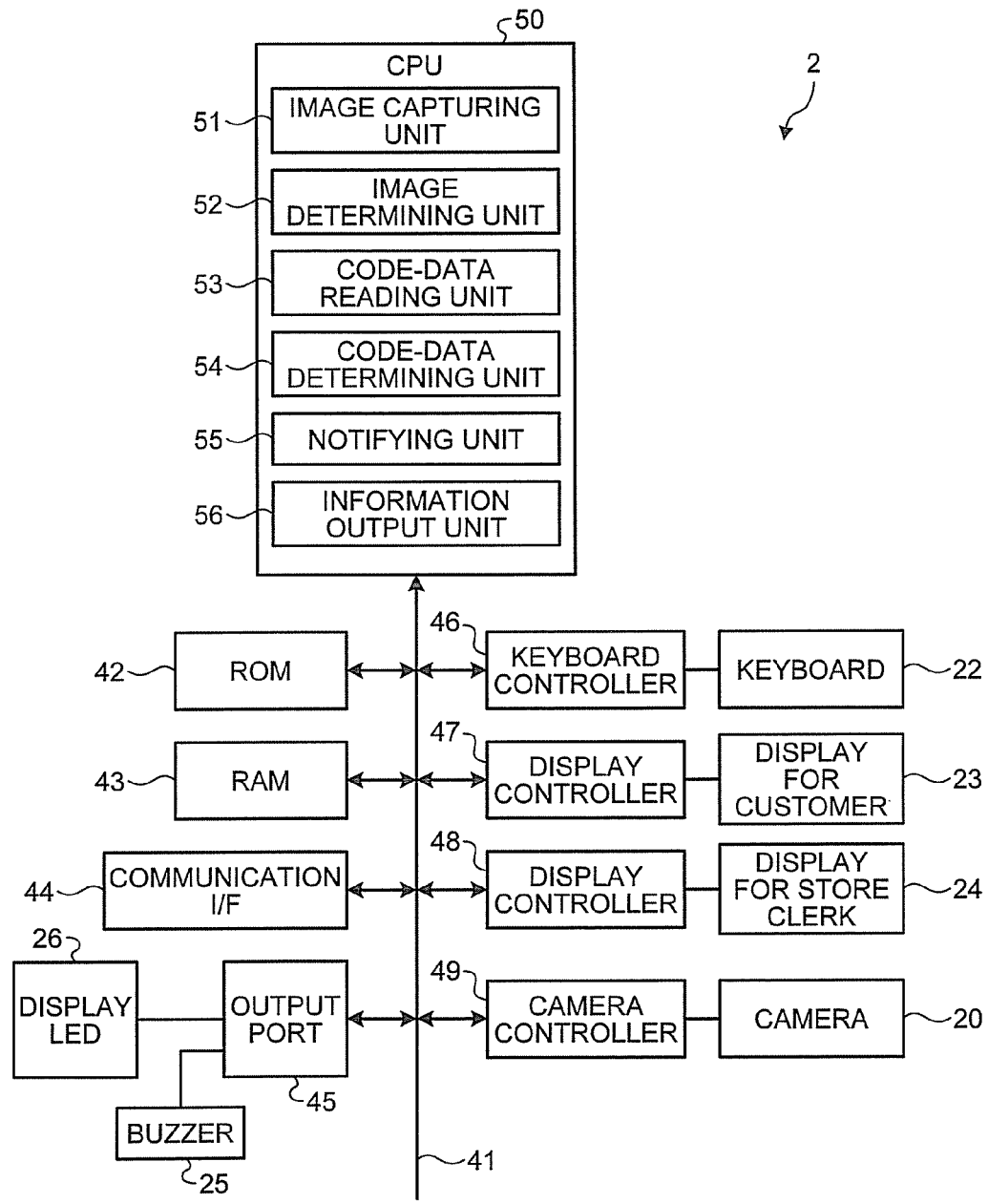
FIG. 2 is a block diagram of the configuration of the code reading apparatus.

FIG. 2 is a block diagram of the configuration of the code reading apparatus 2. The code reading apparatus 2 mainly includes a CPU 50, a ROM 42, a RAM 43, a communication I/F 44, an output port 45, a keyboard controller 46, display controllers 47 and 48, and a camera controller 49. The CPU 50, the ROM 42, the RAM 43, the communication I/F 44, the output port 45, the keyboard controller 46, the display controllers 47 and 48, and the camera controller 49 are connected by a bus line 41 such as an address bus or a data bus.

The CPU 50 functions as a control unit configured to control the entire operation of the code reading apparatus 2. The ROM 42 has stored therein, for example, a computer program according to this embodiment and other computer programs for controlling the operation of the CPU 50. The RAM 43 functions as a work area when the CPU 50 expands the various computer programs stored by the ROM 42. The RAM 43 stores various data such as image data picked up by the camera 20.

The communication I/F 44 controls data communication with the POS terminal 3 (see FIG. 1) connected via a bus. The output port 45 outputs driving signals to the buzzer 25 and the display LED 26. The keyboard controller 46 retrieves a key signal from the keyboard 22. The display controller 47 controls data display on the display for customer 23. The display controller 48 controls data display on the display for store clerk 24. The camera controller 49 controls an image pickup operation of the camera 20. The camera 20 picks up an image of a code symbol such as a barcode or a two-dimensional code attached to a commodity.

The CPU 50 operates according to the computer programs stored by the ROM 42 and expanded on the RAM 43 to function as an image capturing unit 51, an image determining unit 52, a code-data reading unit 53, a code-data determining unit 54, a notifying unit 55, and an information output unit 56, as shown in FIG. 2.

A barcode label attached to a commodity is explained bellow with reference to an example.

Figure 3:
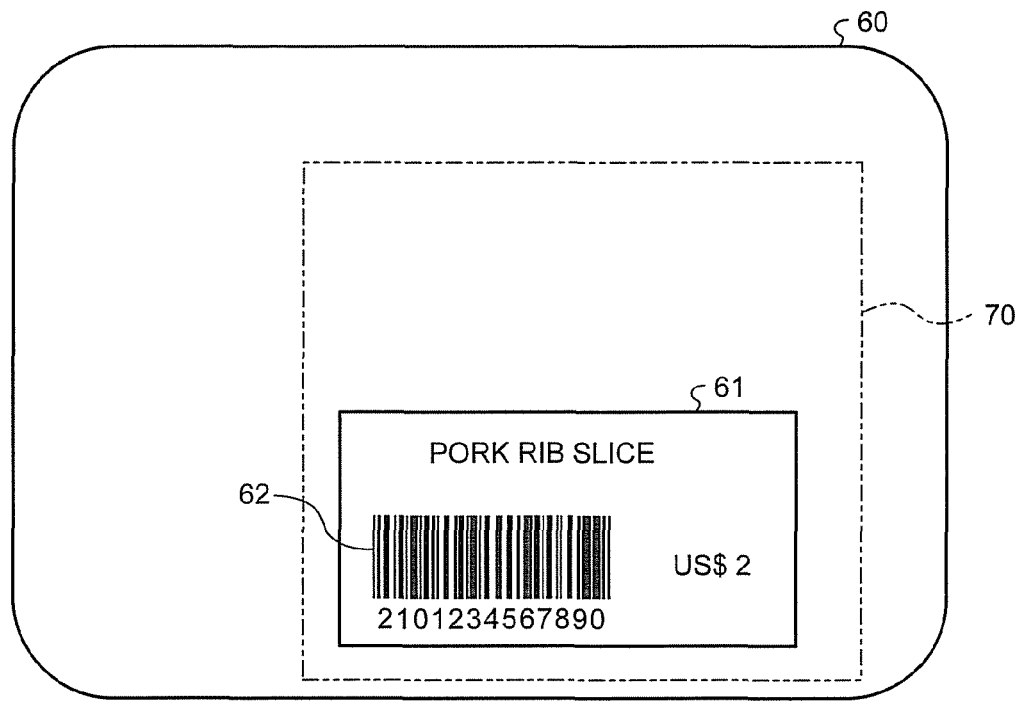
FIG. 3 is a diagram of an example of a barcode label attached to a commodity.

FIG. 3 is a diagram of an example of a barcode label 61 attached to a commodity 60. A commodity name "pork rib slice", a commodity price "US$ 2", a barcode 62, and the like are displayed on the barcode label 61. Code data of a manufacturer code, a commodity code, and the like are incorporated in the barcode 62 as commodity information necessary for registering sales of the commodity 60 in the POS terminal 3. Code data "2101234567890" incorporated in the barcode 62 is displayed as a number in a lower part of the barcode 62. An area surrounded by an alternate long and two short dashes line in FIG. 3 is an image pickup area 70 in which the camera 20 can pick up an image in one frame.

The image capturing unit 51 captures an image D (see FIG. 4) in the image pickup area 70 picked up by the camera 20 into an image work area of the RAM 43.

A positional relation between the commodity 60 and the camera 20 for obtaining image quality necessary for an image analysis of a barcode is explained below.

Figure 4:
FIG. 4 is a diagram of a picked-up image.
Figure 5:
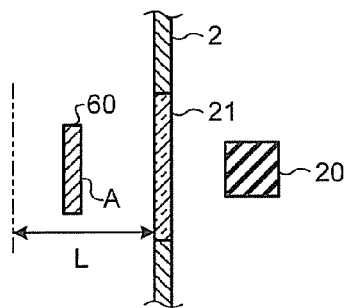
FIG. 5 is an arrangement diagram of a positional relation between a commodity and a camera.

FIG. 5 is an arrangement diagram of a positional relation between the commodity 60 and the camera 20 in which the image quality necessary for an image analysis of a barcode can be obtained. In the figure, L represents a limit of a distance at which an image of the barcode 62 can be picked up in size larger than predetermined size by the camera 20. In FIG. 5, the operator sets a label attached surface A of the commodity 60 to be right opposed to the reading window 21 and holds the commodity 60 over the camera 20 in a position where a distance between the commodity 60 and the reading window 21 is smaller than the distance L. In this case, the camera 20 can pick up an image of the commodity 60 as shown in FIG. 3 and capture the image D having contrast, resolution, and intensity sufficient for analyzing an image of a barcode as shown in FIG. 4.

Figure 6:
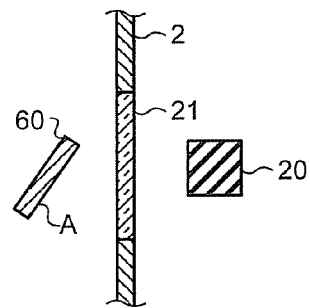
FIG. 6 is an arrangement diagram of another positional relation between the commodity and the camera.
Figure 7:
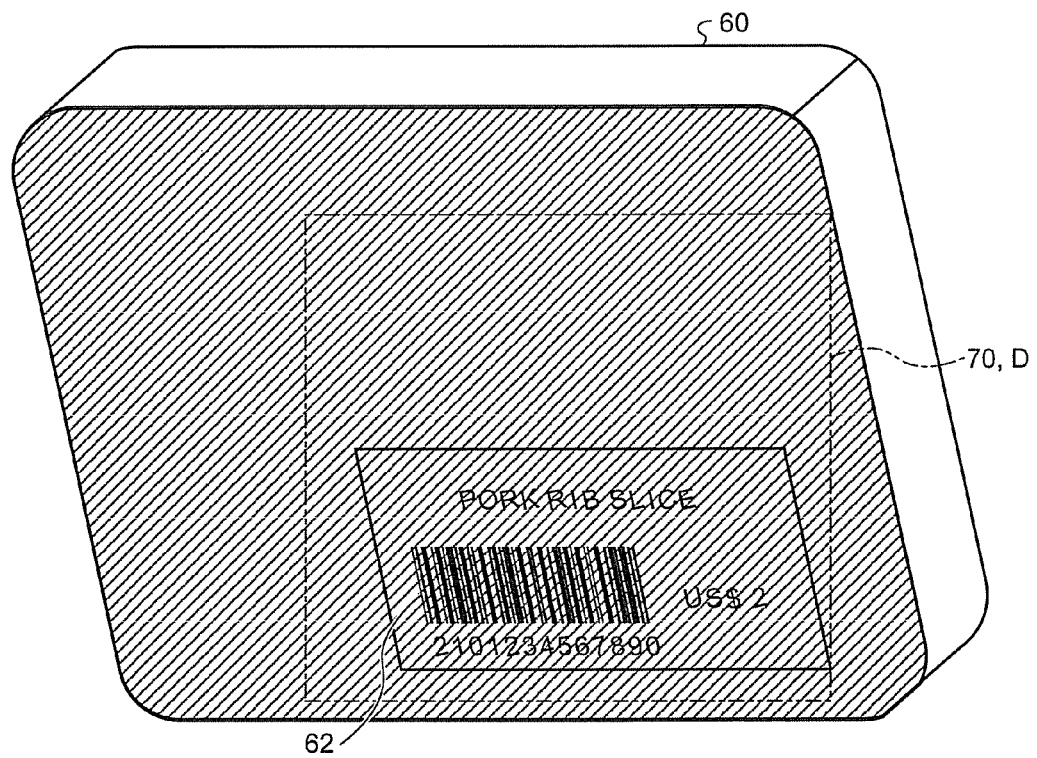
FIG. 7 is a diagram of the commodity tilting with respect to the camera.

On the other hand, FIG. 6 is an arrangement diagram of an example of a positional relation between the commodity 60 and the camera 20 in which the image quality necessary for an image analysis of a barcode cannot be obtained. In FIG. 6, the operator holds the commodity 60 over the camera 20 in a state in which the label attached surface A of the commodity 60 is tilted to the ground side with respect to the reading window 21. In this case, as shown in FIG. 7, light irradiated on the label attached surface A of the commodity 60 dims. Therefore, in the image D in the image pickup area 70, the intensity of the entire image falls and the contrast falls. If the label attached surface A is excessively tilted to the ceiling side, the intensity of the entire image rises and the contrast falls.

Figure 8:
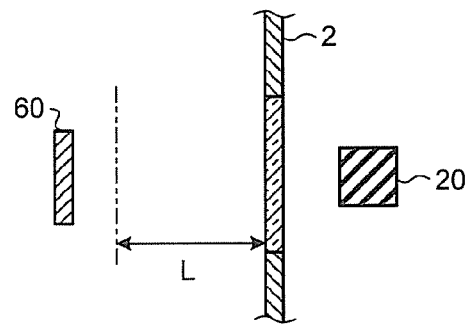
FIG. 8 is an arrangement diagram of still another positional relation between the commodity and the camera.
Figure 9:
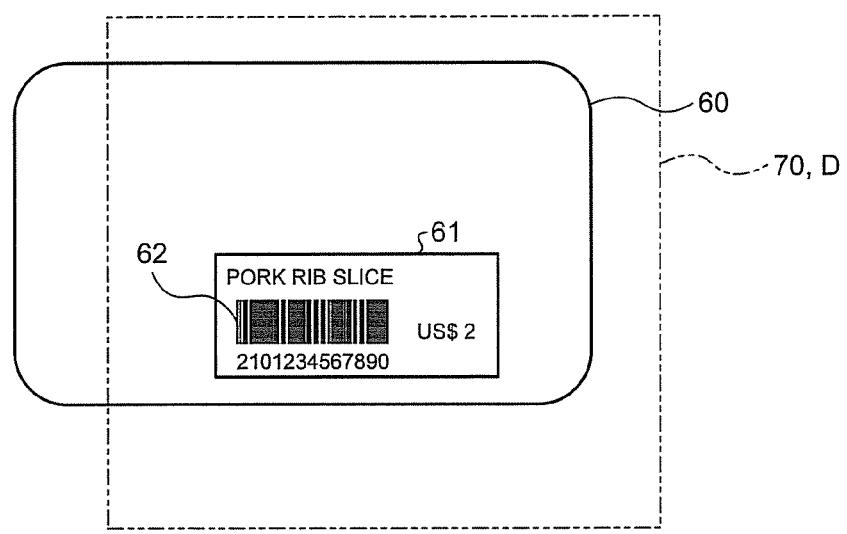
FIG. 9 is a diagram of the commodity placed away from the camera.

FIG. 8 is an arrangement diagram of another example of the positional relation between the commodity 60 and the camera 20 in which the image quality necessary for an image analysis of a barcode cannot be obtained. In FIG. 8, the operator holds the commodity 60 over the camera 20 in a position where a distance between the commodity 60 and the reading window 21 is larger than the distance L. In this case, the size of an image of the barcode label 61 captured in the image pickup area 70 is small as shown in FIG. 9. Therefore, the resolution of the image D in the image pickup area 70 falls. If the commodity 60 is excessively close to the reading window 21, light is not irradiated on the label attached surface A, the contrast and the resolution of the image D fall, and the intensity of the entire image falls.

The image determining unit 52 determines whether the image D captured by the image capturing unit 51 satisfies predetermined conditions for image qualities. The computer program according to this embodiment or the RAM 43 stores, as the predetermined conditions for the image qualities, conditions such as a tolerance of the contrast, a tolerance of the intensity of the entire image, a tolerance of the resolution, and a tolerance of the image size of the barcode 62. The image determining unit 52 compares the qualities of the captured image D respectively with the conditions and determines whether all the conditions are satisfied.

Specifically, the image determining unit 52 determines whether the contrast is within a predetermined tolerance in the image D. The image determining unit 52 determines whether the intensity of the entire image is within a predetermined tolerance in the image D. The image determining unit 52 determines whether the resolution is within a predetermined tolerance in the image D. Further, the image determining unit 52 determines whether the image size of a code symbol is within a predetermined tolerance in the image D.

If at least one of the predetermined conditions for the image qualities is not satisfied, the image determining unit determines a cause that prevents satisfaction of the condition.

As an example, if the intensity of the entire image is lower than the predetermined tolerance and the contrast is lower than the predetermined tolerance, the image determining unit 52 determines that the label attached surface A tilts to the ground side. If the intensity of the entire image is higher than the predetermined tolerance and the contrast is lower than the predetermined tolerance, the image determining unit 52 determines that the label attached surface A tilts to the ceiling side.

If the image size of the barcode label 61 is smaller than the predetermined tolerance in the image pickup area 70, the image determining unit 52 determines that the commodity 60 is away from the camera 20.

The notifying unit 55 displays, on the display for store clerk 24, the cause of the prevention determined by the image determining unit 52 or a method of improving the image pickup and notifies the operator of the cause of the prevention or the method of improving the image pickup.

Figure 10:
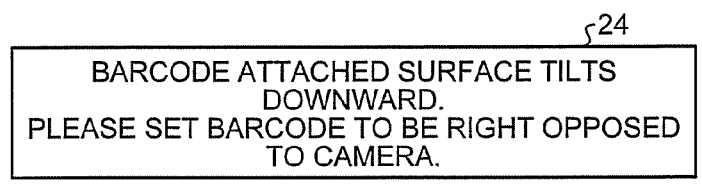
FIG. 10 is a diagram of an example of a message displayed on a display for store clerk.

For example, if the image determining unit 52 determines that the label attached surface A tilts to the ground side as explained above, the notifying unit 55 sounds a buzzer 25 and controls the display controller 48 to display "The barcode attached surface tilts downward. Please sets the barcode to be right opposed to the camera." (see FIG. 10) on the display for store clerk 24.

Figure 11:
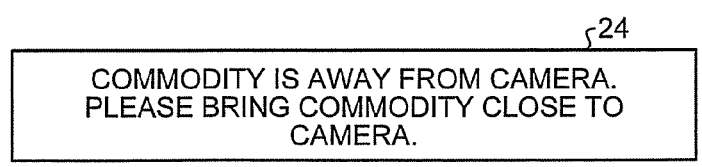
FIG. 11 is a diagram of an example of the message displayed on the display for store clerk.

If the image determining unit 52 determines that the commodity 60 is away from the camera 20 as explained above, the notifying unit 55 sounds the buzzer 25 and controls the display controller 48 to display "The commodity is away from the camera. Please bring the commodity close to the camera." (see FIG. 11) on the display for store clerk 24.

If the image determining unit 52 determines that the predetermined conditions for the image qualities are satisfied, the code-data reading unit 53 reads code data included in the barcode 62 from the image D (see FIG. 4) of the barcode 62. More specifically, the code-data reading unit 53 binarizes the image D of one frame stored in the image work area of the RAM 43. The code-data reading unit 53 detects a data area concerning the barcode 62 from the binarized data. The code-data reading unit 53 decodes the barcode 62 in the detected data area and reads the code data from the barcode 62.

Figure 12:
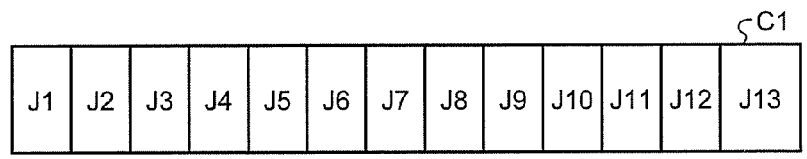
FIG. 12 is a diagram of an example of code data.

FIG. 12 is a diagram for explaining an example of code data C1. As shown in FIG. 12, the code data C1 includes a manufacturer code J1 to J9, a commodity item code J10 to J12 as commodity information, and a check digit J13. The code-data reading unit 53 stores the read code data C1 in a barcode work area of the RAM 43.

The code-data determining unit 54 determines whether the code data C1 read by the code-data reading unit 53 satisfies predetermined conditions for code data.

Specifically, the code-data determining unit 54 determines whether the code data C1 has a predetermined number of digits (in FIG. 12, thirteen digits). The code-data determining unit 54 calculates a check digit using the manufacturer code J1 to J9 and the commodity item code J10 to J12 and determines whether a calculation result coincides with the check digit J13.

A cause that prevents satisfaction of the predetermined conditions for code data is explained with reference to FIGS. 13 and 14.

Figure 13:
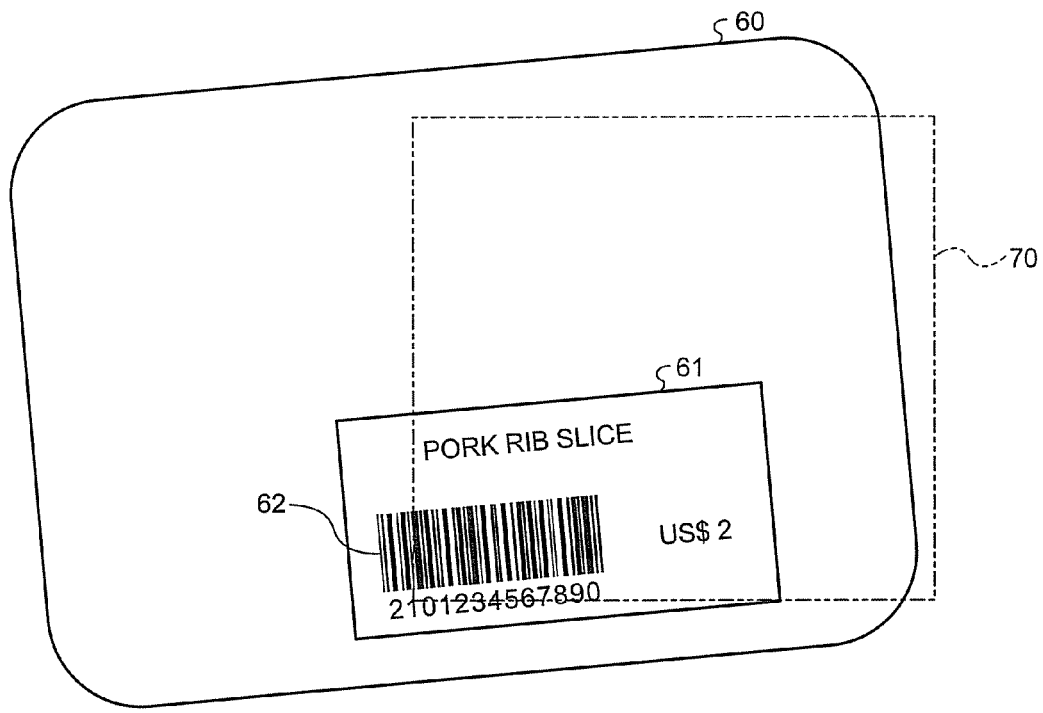
FIG. 13 is a diagram for explaining a part of the code data that cannot be read.

As shown in FIG. 13, if the operator scans the commodity 60 without setting the barcode 62 in the image pickup area 70, an image of a part of the barcode 62 is not picked up. Therefore, digits of a part of the code data C1 read by the code-data reading unit 53 are cancelled and, for example, data of J1 to J3 among the thirteen digits of J1 to J13 cannot be obtained.

Figure 14:
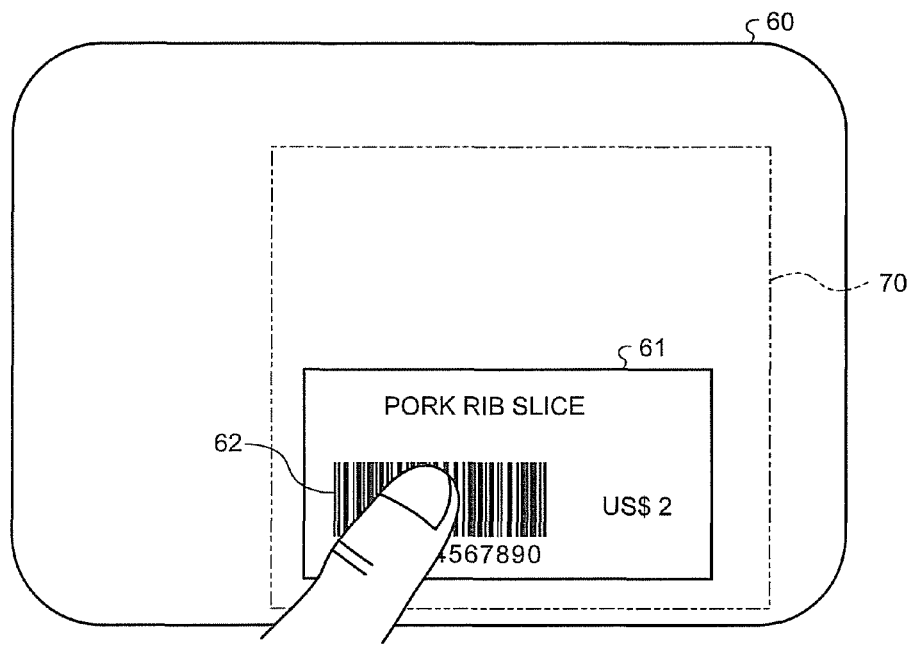
FIG. 14 is a diagram of another example of a part of the code data that cannot be read.

As shown in FIG. 14, if the operator holds the commodity 60 placing a finger on the barcode 62 and scans the commodity 60, a part of the barcode 62 is hidden by the finger. Therefore, in this case, as in the case explained above, a part of the code data C1 read by the code-data reading unit 53 cannot be read.

If the code-data reading unit 53 cannot correctly reads each of J1 to J13 of the code data C1 because the barcode 62 is soiled or package of the commodity 60 is wrinkled, the check digit calculated by using J1 to J12 does not coincide with a value of J13.

If at least one of the predetermined conditions for code data is not satisfied, i.e., if digits of a part of the code data C1 are dropped or the check digit does not coincide with the value of J13, the code-data determining unit 54 determines a cause that prevents satisfaction of the condition.

Specifically, if digits of a part of the code data C1 are dropped, the code-data determining unit 54 determines that an image of a part of the barcode 62 is not picked up. If the check digit does not coincide with the value of J13, the code-data determining unit 54 determines that the barcode 62 is not correctly read.

As explained above, the image determining unit 52 and the code-data determining unit 54 function as a determining unit configured to determine whether the image D captured by the image capturing unit 51 satisfies a predetermined condition for extracting code data from a code symbol.

The notifying unit 55 displays, on the display for store clerk 24, the cause of the prevention or the method of improving the image pickup determined by the code-data determining unit 54 as explained above and notifies the operator of the cause of the prevention or the method of improving the image pickup.

Figure 15:
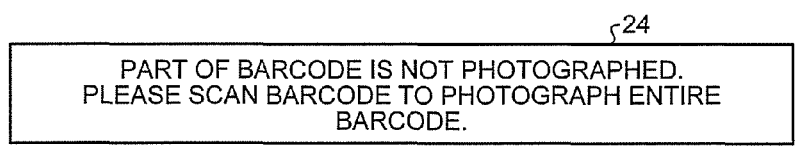
FIG. 15 is a diagram of an example of the message displayed on the display for store clerk.

For example, if digits of a part of the code data C1 are dropped as explained above, the notifying unit 55 sounds the buzzer 25 and controls the display controller 48 to display "A part of the barcode is not photographed. Please scan the barcode to photograph the entire barcode." (see FIG. 15) on the display for store clerk 24.

Figure 16:
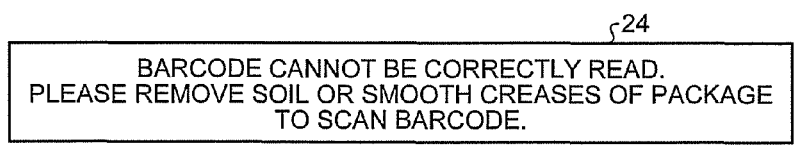
FIG. 16 is a diagram of an example of the message displayed on the display for store clerk.

If the check digit of the code data C1 does not coincide with the value of J13 as explained above, the notifying unit 55 sounds the buzzer 25 and controls the display controller 48 to display "The barcode cannot be correctly read. Please remove the soil or smooth the creases of the package to scan the barcode." (see FIG. 16) on the display for store clerk 24.

The information output unit 56 outputs the code data C1 read by the code-data reading unit 53 to the POS terminal 3 via the communication I/F 44. The POS terminal 3 performs sales registration for the commodity 60 using the received code data C1.

Figure 17:
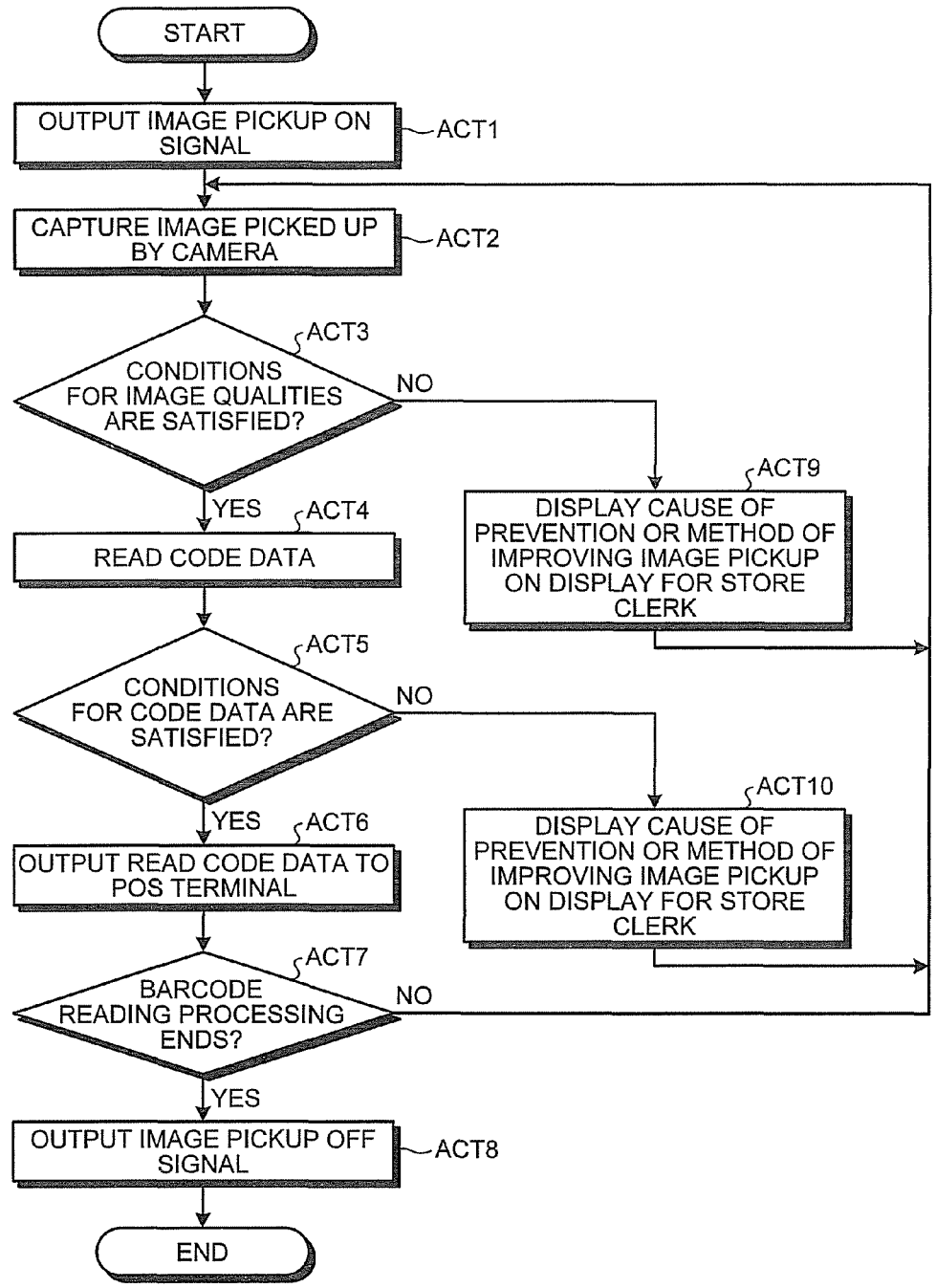
FIG. 17 is a flowchart for explaining a procedure of barcode reading processing executed by the code reading apparatus.

Sales registration processing for a commodity performed by the code reading apparatus 2 is explained below with reference to FIG. 17. FIG. 17 is a flowchart for explaining a procedure of barcode reading processing performed by the code reading apparatus 2.

When the image capturing unit 51 receives an instruction for the start of scanning from the POS terminal 3, the image capturing unit 51 outputs an image pickup ON signal to the camera controller 49 and starts image pickup by the camera 20 (Act 1).

The image capturing unit 51 captures the image D picked up by the camera 20 into the image work area of the RAM 43 (Act 2).

The image determining unit 52 determines whether the image D captured in Act 2 satisfies all predetermined conditions for image qualities such as resolution and contrast (Act 3).

If at least one of the conditions is not satisfied (No in Act 3), the notifying unit 55 sounds the buzzer 25, displays a cause that prevents satisfaction of the condition or a method of improving the image pickup on the display for store clerk 24, and notifies the operator of the cause of the prevention or the method of improving the image pickup (Act 9). Thereafter, the code reading apparatus 2 returns to Act 2. The operator scans the barcode 62 again referring to a message displayed on the display for store clerk 24 (Act 2).

If all the conditions for the image qualities are satisfied (Yes in Act 3), the code-data reading unit 53 reads the code data C1 included in the barcode 62 from the image D (Act 4).

The code-data determining unit 54 determines whether the code data C1 read in Act 4 satisfies all the predetermined conditions for code data (Act 5)

If at least one of the conditions is not satisfied (No in Act 5), the notifying unit 55 sounds the buzzer 25, displays a cause that prevents satisfaction of the condition or a method of improving the image pickup on the display for store clerk 24, and notifies the operator of the cause of the prevention and the method of improving the image pickup (Act 10). Thereafter, the code reading apparatus 2 returns to Act 2. The operator scans the barcode 62 again referring to a message displayed on the display for store clerk 24 (Act 2).

If all the predetermined conditions for code data are satisfied (Yes in Act 5), the information output unit 56 outputs the code data C1 to the POS terminal 3 via the communication I/F 44 (Act 6).

The code reading apparatus 2 determines whether the sales registration processing ends and the end of the barcode reading processing is instructed by the POS terminal 3 (Act 7).

If the end of the barcode reading processing is not instructed (No in Act 7), the code reading apparatus 2 returns to Act 2 and continues the processing in Act 2 and subsequent acts.

If the end of the barcode reading processing is instructed (Yes in Act 7), the code reading apparatus 2 outputs an image pickup OFF signal to the camera controller 49 and ends the image pickup by the camera 20.

As explained above, if the predetermined condition for a code symbol as an image is not satisfied, the code reading apparatus 2 according to this embodiment displays, on the display for store clerk 24, a cause that prevents satisfaction of the condition or a method of improving the image pickup and notifies the operator of the cause of the prevention or the method of improving the image pickup. Consequently, the operator can scan the barcode 62 again referring to a displayed message. Therefore, it is possible to improve a rate of success of reading of code data when an image of the code symbol is picked up again.

In the above explanation, the notifying unit 55 performs the notification using the display for store clerk 24. However, a method of notification is not limited to this. As another example, the code reading apparatus 2 may include a speaker and a speaker controller and notify, by sound, the operator of the cause of the prevention, the method of improving the image pickup, or the like.

In the above explanation, the code reading apparatus 2 determines the condition for a code symbol as an image and notifies a cause that prevents satisfaction of the condition or a method of improving the image pickup. However, the code reading apparatus 2 is not limited to this. For example, the POS terminal 3 may includes a receiving unit configured to receive an image picked up in the code reading apparatus 2 and functions equivalent to the image determining unit 52, the code-data determining unit 54, the notifying unit 55, and the like. The POS terminal 3 may determine whether the condition for a code symbol as an image is satisfied. If at least one of the conditions is not satisfied, the POS terminal 3 may display a message same as the message explained above on the display for operator 32 and notify the operator of a cause that prevents satisfaction of the condition or a method of improving the image pickup.

Further effects and modifications can be easily derived by those skilled in the art. Therefore, broader aspects of the present invention are not limited to the specific details and the representative embodiment shown and described herein. Therefore, various alterations are possible without departing from the spirit or the scope of the general concept of the present invention defined by the appended claims or equivalents of the claims.

As explained above, according to this embodiment, if the condition for extracting code data from a code symbol is not satisfied, a cause that prevents the condition or a method of improving the image pickup is notified. Therefore, since the operator can pick up an image of the code symbol again referring to the cause of the prevention or the method of improving the image pickup, it is possible to improve a rate of success of reading of the code data when an image of the code symbol is picked up again.

What is claimed is:

1. A code reading apparatus comprising:
   an image capturing unit configured to capture an image picked up by an image pickup unit;
   a determining unit configured to determine whether the image captured by the image capturing unit satisfies a condition for extracting code data from a code symbol; and
   a notifying unit configured to notify, if the determining unit determines that the image does not satisfy the condition, a cause that prevents satisfaction of the condition or a method of improving the image pickup.

2. The apparatus according to claim 1, further comprising a code-data reading unit configured to read, if a condition for the code symbol as an image is satisfied, the code data from the image of the code symbol, wherein
   the determining unit determines whether the code data read by the code-data reading unit satisfies a condition for code data.

3. The apparatus according to claim 2, wherein
   the determining unit determines whether a number of digits of the code data read by the code-data reading unit is a predetermined number of digits, and
   the notifying unit notifies, if the determining unit determines that the number of digits of the code data is not the predetermined number of digits, that a part of the image of the code symbol is not picked up.

4. The apparatus according to claim 2, wherein the determining unit calculates a check digit of the code data read by the code-data reading unit and determines whether the calculated check digit coincides with a check digit set in the code data.

5. The apparatus according to claim 1, wherein the determining unit determines whether the image captured by the image capturing unit satisfies predetermined conditions for image qualities.

6. The apparatus according to claim 5, wherein the determining unit determines whether contrast is within a tolerance in the image.

7. The apparatus according to claim 5, wherein the determining unit determines whether intensity of the entire image is within a tolerance in the image.

8. The apparatus according to claim 5, wherein the determining unit determines whether resolution is within a tolerance in the image.

9. The apparatus according to claim 5, wherein the determining unit determines whether image size of the code symbol is within a tolerance in the image.

10. A sales registration processing apparatus comprising:
a receiving unit configured to receive an image picked up in a code reading apparatus;
a determining unit configured to determine whether the image received by the receiving unit satisfies a condition for extracting code data from a code symbol;
a notifying unit configured to notify, if the determining unit determines that the image does not satisfy the condition, a cause that prevents satisfaction of the condition or a method of improving the image pickup.

11. A code reading method executed in a code reading apparatus, the code reading method comprising:
capturing an image picked up by an image pickup unit;
determining whether the captured image satisfies a condition for extracting code data from a code symbol; and
notifying, if it is determined that the image does not satisfy the condition, a cause that prevents satisfaction of the condition or a method of improving the image pickup.

* * * * *